US007616397B2

(12) United States Patent
Hayakawa et al.

(10) Patent No.: US 7,616,397 B2
(45) Date of Patent: Nov. 10, 2009

(54) DISK DRIVE AND DISK DRIVE CONTROL METHOD

(75) Inventors: Satoshi Hayakawa, Kanagawa (JP); Masakazu Sasaki, Kanagawa (JP); Kohichi Takeuchi, Kanagawa (JP); Jun Ishikawa, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/645,251

(22) Filed: Dec. 21, 2006

(65) Prior Publication Data

US 2008/0019032 A1  Jan. 24, 2008

(30) Foreign Application Priority Data

Jan. 4, 2006  (JP) .............................. 2006-000254

(51) Int. Cl.
*G11B 21/02* (2006.01)
(52) U.S. Cl. ...................................... 360/75; 360/294.7
(58) Field of Classification Search ........................ None
See application file for complete search history.

(56) References Cited

U.S. PATENT DOCUMENTS

| 4,040,103 | A | * | 8/1977 | White ........................... 360/75 |
| 5,777,815 | A | | 7/1998 | Kasiraj et al. |
| 5,991,113 | A | * | 11/1999 | Meyer et al. .................. 360/75 |
| 6,046,877 | A | * | 4/2000 | Kelsic .......................... 360/75 |
| 6,282,038 | B1 | * | 8/2001 | Bonaccio et al. .............. 360/46 |
| 6,359,746 | B1 | | 3/2002 | Kakekado et al. |
| 6,798,605 | B2 | | 9/2004 | Kurita et al. |
| 6,927,929 | B2 | * | 8/2005 | Gong et al. .................... 360/31 |
| 7,184,246 | B2 | * | 2/2007 | Sasaki et al. ............. 360/294.7 |
| 7,372,665 | B1 | * | 5/2008 | Stoev et al. ............. 360/125.33 |
| 2003/0174430 | A1 | | 9/2003 | Takahashi et al. |
| 2004/0114268 | A1 | * | 6/2004 | Satoh et al. ................... 360/75 |

FOREIGN PATENT DOCUMENTS

| CN | 1173691 A | 2/1998 |
| JP | 05-020635 | 1/1993 |
| JP | 2005-004909 | 1/2005 |

* cited by examiner

*Primary Examiner*—Jason C Olson
(74) *Attorney, Agent, or Firm*—Townsend and Townsend and Crew LLP; Patrick Duncan

(57) ABSTRACT

Embodiments in accordance with the present invention improve the head characteristic and avoid collisions between a head element section and a recording disk. A hard disk drive according to an embodiment of the present invention performs TFC (Thermal Fly height Control) to adjust the clearance between the head element section and recording disk by means of thermal expansion. A head slider includes a TFC heater. The hard disk drive detects its acceleration and controls the TFC heater in accordance with the detected acceleration, thereby reducing the probability of collision between the head element section and recording disk. Further, the hard disk drive detects residual vibration prevailing after impact application. The heater turns back ON when the residual vibration becomes lower than a reference level.

13 Claims, 7 Drawing Sheets

DISK DRIVE AND DISK DRIVE CONTROL METHOD

CROSS-REFERENCE TO RELATED APPLICATION

The instant nonprovisional patent application claims priority to Japanese Patent Application No. 2006-000254, filed Jan. 4, 2006 and incorporated by reference herein for all purposes.

BACKGROUND OF THE INVENTION

Embodiments in accordance with the present invention relate to a disk drive and disk drive control method, and more particularly to a disk drive whose head slider includes a heater for adjusting the clearance between a head element section and recording disk, and a method for controlling the heater.

Devices using various types of media such as optical disks, magnetic tapes, and semiconductor memories are known in the art as data storage devices. Among them, hard disk drives (hereinafter referred to as HDDs) have become popular as storage devices for computers to such an extent that they are one of the storage devices indispensable for today's computer systems. Further, not limited to the computers as described above, HDDs are expanding more and more in application because of their excellent characteristics. For example, HDDs are used for moving picture recording/reproducing devices, car navigation systems, cellular phones, and removable memories for use in digital cameras.

A magnetic disk for use with a hard disk drive (HDD) contains a plurality of concentric data tracks. Each data track contains a plurality of servo data, which includes address information, and a plurality of data sectors, which includes user data. A plurality of data sectors are recorded between servo data. A data write into a data sector and a data read from a data sector are performed when a head element section of a head slider, which is supported by an oscillating actuator, accesses a desired data sector in accordance with the address information included in the servo data.

For an increase in the recording density of the magnetic disk, it is important that the clearance between the magnetic disk and the head element section, which flies over the magnetic disk, be decreased. A number of mechanisms for adjusting the clearance were proposed. In one of the proposed mechanisms, the head slider is provided with a heater, which heats the head element section to adjust the clearance (refer, for instance, to Japanese Patent Laid-Open No. 20635/1993). This technology is hereinafter referred to as the TFC (Thermal Fly height Control) technology. The TFC technology supplies a current (power) to the heater for heat generation, and protrudes the head element section by means of thermal expansion. This makes it possible to reduce the clearance between the magnetic disk and head element section.

Two types of head element section protrusion occur during a normal operation. More specifically, the head element section protrudes due to a rise in the environmental temperature (this is referred to as environmental protrusion). The head element section also protrudes when a write element generates heat during a data write (this is referred to as write protrusion). The write element generates a magnetic field to write data onto the magnetic disk when a current flows to a coil. The resulting write current causes the write element to generate heat.

When a hard disk drive is to be designed, the clearance is determined to avoid collision between the head element section and magnetic disk while considering the environmental protrusion, which is based on the environmental temperature, and write protrusion, which is based on the write current. Therefore, adequate read performance can be obtained in a high-temperature environment due to environmental protrusion; however, adequate read performance may not be obtained in a low-temperature environment. Further, the clearance provided at an initial stage of a data write may differ from the clearance provided later due to write protrusion so that an inadequate write results at the initial stage of a data write (poor overwrite).

The TFC technology reduces the clearance between the head element section and magnetic disk to solve a problem in which the read performance deteriorates due to environmental temperature changes and a poor overwrite occurs at the initial stage of a data write. On the other hand, the TFC technology protrudes the head element section as compared to the normal situation. Therefore, it is likely to incur collision between the magnetic disk and head element section. Consequently, it is extremely important during the use of the TFC technology that the timing for energizing the heater to protrude the head element section be properly controlled.

As described earlier, hard disk drives are used for various applications. An external impact is often applied to the hard disk drives particularly when they are built in a notebook PC, digital camera, or other portable electronic device. When an external impact is applied to a hard disk drive, the actuator may vibrate, thereby causing the head element section to collide against the magnetic disk. If the TFC technology protrudes the head element section while the actuator is significantly vibrating, the probability of collision between the head element section and magnetic disk increases.

Impact-induced actuator vibration does not end immediately. Residual vibration of the actuator continues subsequently. The head element section is positioned near the magnetic disk during such a residual vibration period. Therefore, if the head element section is protruded, the probability of collision between the head element section and magnetic disk increases. Meanwhile, it is demanded from the viewpoint of hard disk drive performance that the heater be turned ON as soon as possible to start a data write/data read operation.

BRIEF SUMMARY OF THE INVENTION

Embodiments in accordance with the present invention improve the head characteristic and avoid collisions between a head element section and a recording disk. A hard disk drive according to an embodiment of the present invention performs TFC (Thermal Fly height Control) to adjust the clearance between the head element section and recording disk by means of thermal expansion. A head slider includes a TFC heater. The hard disk drive detects its acceleration and controls the TFC heater in accordance with the detected acceleration, thereby reducing the probability of collision between the head element section and recording disk. Further, the hard disk drive detects residual vibration prevailing after impact application. The heater turns back ON when the residual vibration becomes lower than a reference level.

For a more complete understanding of the present invention, reference is made to the following detailed description taken in conjunction with the accompanying drawings.

DETAILED DESCRIPTION OF THE INVENTION

Figure 1:
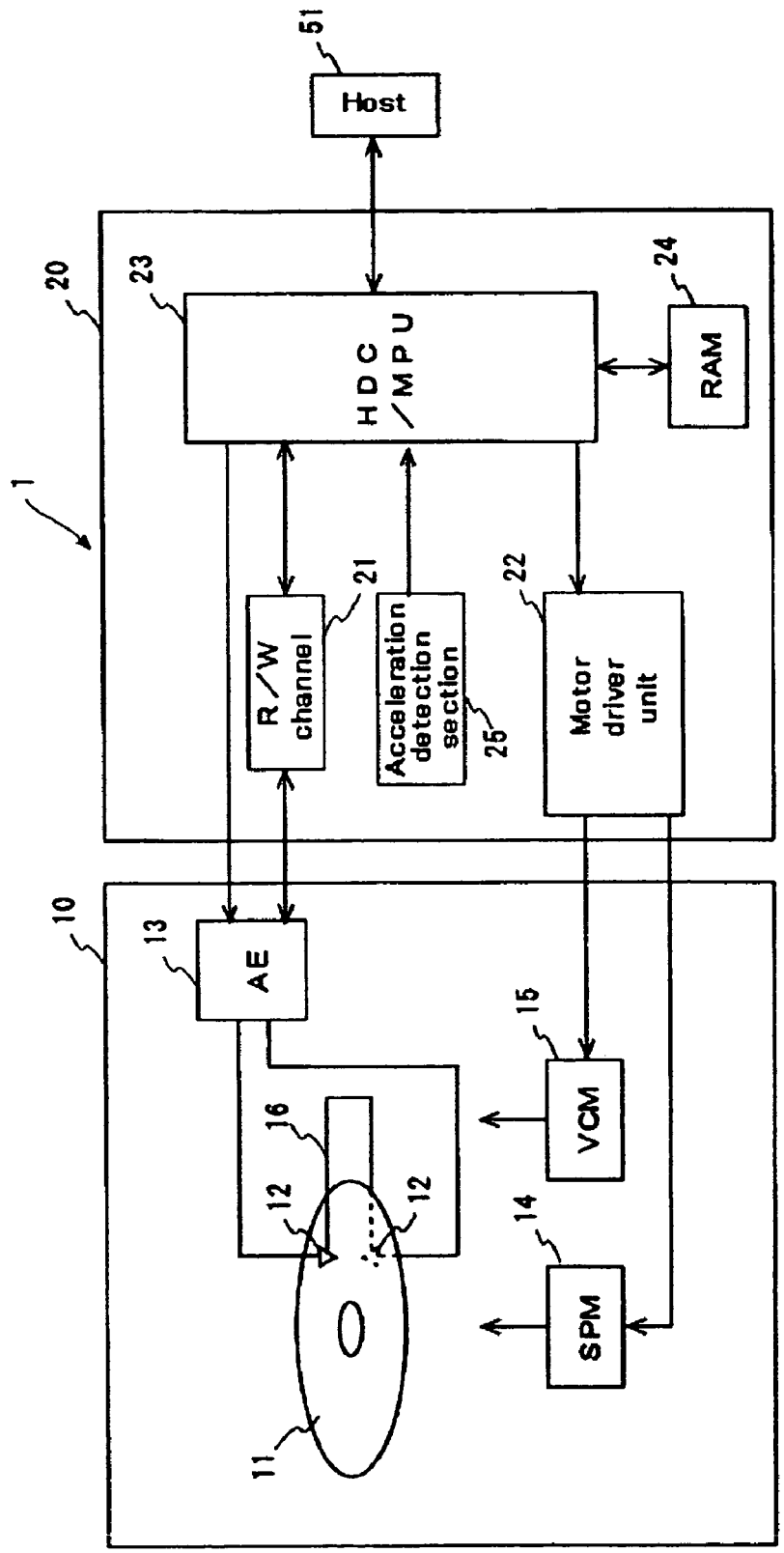
FIG. 1 is a schematic block diagram illustrating the overall functional configuration of a hard disk drive according to an embodiment of the present invention.

It is an object of an embodiment of the present invention to reduce the possibility of collision between the recording disk and head during the use of a technology for adjusting the clearance between the head element section and recording disk by protruding the head element section through the use of a heater.

According to one embodiment of the present invention, there is provided a disk drive comprising: a slider that flies over a rotating recording disk; a head element section that is mounted on the slider; a heater that is mounted on the slider to protrude the head element section by means of thermal expansion for the purpose of adjusting the clearance between the head element section and the recording disk; an actuator that retains and moves the slider; an acceleration detection section; and a controller for controlling the heater in accordance with the acceleration detected by the acceleration detection section. Since the heater is controlled in accordance with the acceleration detected by the acceleration detection section, it is possible to improve the head characteristic and avoid a head-disk collision during heater activation.

In some embodiments, the controller turns OFF the heater when the acceleration detection section detects an acceleration lower than a first reference level in the direction of gravity. This makes it possible to predict the impact that is to be applied to the disk drive, and exercise heater control before possible collision.

The controller may turn OFF the heater when the acceleration detection section detects an acceleration higher than a second reference level. This makes it possible to detect an impact that is higher than a reference level, prevent an impact-induced head-disk collision, and avoid unnecessary heater OFF control.

The controller turns OFF the heater when the acceleration detection section detects either an acceleration lower than the first reference level in the direction of gravity or an acceleration higher than the second reference level. Since two reference acceleration levels are provided, it is possible to cope with a fall-induced impact and an impact that is not based on a fall.

In some embodiments, the controller turns ON the heater when the residual vibration of the head element section is lower than a reference level after the heater is turned OFF. The heater then turns ON when the residual vibration persists. This makes it possible to avoid an increase in the possibility of a head-disk collision.

The controller may determine the residual vibration level of the head element section in accordance with a signal amplitude that the head element section reads from the magnetic disk. In some embodiments, the disk drive further comprises a variable gain amplifier for amplifying a signal that is read by the head element section, and that the controller use a gain value of the variable gain amplifier as the data indicating the signal amplitude. This makes it possible to detect the residual vibration with ease and certainty.

The controller may determine the residual vibration level of the head in accordance with the signal amplitude of a servo signal that is read by the head element section. This ensures that the residual vibration can be detected during a servo control process and that residual vibration detection is achieved efficiently and effectively.

According to another embodiment of the present invention, there is provided a control method for use in a disk drive comprising a slider that flies over a rotating recording disk; a head element section that is mounted on the slider; and a heater that is mounted on the slider to protrude the head element section by means of thermal expansion for the purpose of adjusting the clearance between the head element section and the recording disk, the control method comprising the steps of: turning ON the heater to let the head element section access the recording disk; detecting a fall of the disk drive and/or an impact on the disk drive; and turning OFF the heater when a fall of the disk drive or an impact higher than a reference level is detected. Since the heater turns OFF when the disk drive falls or is impacted, it is possible to improve the head characteristic through the use of the heater and reduce the possibility of a head-disk collision.

In some embodiments, a fall of the disk drive and an impact on the disk drive is detected, and the heater turns OFF when at least either a fall of the disk drive or an impact higher than a reference level is detected. This makes it possible to cope with a fall-induced impact and an impact that is not based on a fall.

The residual vibration of the head element section may be detected after the heater is turned OFF, and the heater turns ON when the detected residual vibration is lower than a reference level. This turns ON the heater when the residual vibration exists, thereby making it possible to avoid an increase in the possibility of a head-disk collision.

The level of the residual vibration may be judged in accordance with the amplitude of a signal that the head element section reads from the recording disk. In some embodiments, the residual vibration is judged in accordance with the amplitude of a servo signal that the head element section reads from the recording disk.

According to still another embodiment of the present invention, there is provided a disk drive comprising: a slider that flies over a rotating recording disk; a head element section that is mounted on the slider; a heater that is mounted on the slider to protrude the head element section by means of thermal expansion for the purpose of adjusting the clearance between the head element section and the recording disk; an actuator that retains and moves the slider; a detection section for detecting a fall of the disk drive and/or an impact on the disk drive; and a controller for turning OFF the heater when a fall of the disk drive or an impact higher than a reference level is detected. Since the heater turns OFF when the disk drive falls or is impacted, it is possible to improve the head characteristic through the use of the heater and reduce the possibility of a head-disk collision.

The present invention can reduce the possibility of collision between the recording disk and head during the use of a technology for adjusting the clearance between the head element section and recording disk by protruding the head element section through the use of a heater.

Embodiments of the present invention will now be described. The following description and the accompanying drawings are abridged or simplified as appropriate. Like elements in the drawings are denoted by like reference numerals and will not be described repeatedly for clarify of explanation.

A disk drive according to an embodiment of the present invention exercises TFC (Thermal Fly height Control) to adjust the clearance between a head element section and a recording disk by means of thermal expansion. A head slider according to an embodiment of the present invention includes a heater. The heat generated by the heater is used to adjust the clearance between the head and recording disk. The disk drive according to an embodiment of the present invention detects its acceleration and controls the TFC heater in accordance with the detected acceleration. This decreases the probability of collision between the head element section and recording disk.

Further, the disk drive detects residual vibration existing after impact application, and turns the heater back ON when the residual vibration becomes lower than a reference level. This reduces the possibility of collision between the recording disk and head element section due to impact-induced residual vibration. Furthermore, since the disk drive detects the residual vibration and turns ON the heater, it is possible to turn ON the heater promptly in accordance with vibration.

According to an embodiment of the present invention, the overall configuration of a hard disk drive, will be described to facilitate the understanding of the features of the present embodiment. FIG. 1 is a schematic block diagram illustrating the overall configuration of a hard disk drive 1 according to an embodiment of the present invention. As shown in FIG. 1, the hard disk drive 1 includes a magnetic disk 11, a head slider 12, an arm electronic circuit (arm electronics or AE) 13, a spindle motor (SPM) 14, a voice coil motor (VCM) 15, and an actuator 16. These components are housed within a hermetically closed enclosure 10.

The hard disk drive 1 also includes a circuit board 20, which is fastened to the outer surface of the enclosure 10. Mounted on the circuit board 20 are a read/write channel (R/W channel) 21, a motor driver unit 22, a hard disk controller (HDC) and an MPU (this integrated circuit is hereinafter referred to as the HDC/MPU) 23, a RAM 24, and other ICs. An acceleration detection section 25 is also mounted on the circuit board 20 to detect the acceleration of the hard disk drive. The circuit components can be integrated into a single IC or mounted separately in a plurality of ICs. The acceleration detection section 25 can be mounted within the enclosure 10. When user data is supplied from an external host 51, it is received by the HDC/MPU 23 and written onto the magnetic disk 11 by the head slider 12 via the R/W channel 21 and AE 13. User data stored on the magnetic disk 11 is read by the head slider 12 and then output from the HDC/MPU 23 to the external host 51 via the AE 13 and R/W channel 21.

The magnetic disk 11 is fastened to the SPM 14. The SPM 14 rotates the magnetic disk 11 at a predetermined speed. In accordance with control data supplied from the HDC/MPU 23, the motor driver unit 22 drives the SPM 14. Both sides of the magnetic disk 11 according to the present embodiment are provided with a recording surface for data recording. The head slider 12 is provided for each recording surface. Each head slider 12 includes a slider, which flies over the magnetic disk, and a head element section, which is fastened to the slider to provide conversion between magnetic signals and electrical signals. The head slider 12 according to the present embodiment includes a heater for heating to protrude the head element section and adjusting the clearance (flying height) between the head slider 12 and magnetic disk 11 for TFC (Thermal Fly height Control) purposes. The structure of the head slider 12 will be described in detail later with reference to FIG. 2.

Each head slider 12 is fastened to a leading end of the actuator 16. The actuator 16 is coupled to the VCM 15. When the actuator turns around a turning shaft, the head slider 12 moves over a rotating magnetic disk 11 in its radial direction. The motor driver unit 22 drives the VCM 15 in accordance with the control data (called the DACOUT) supplied from the HDC/MPU 23. There should be at least one magnetic disk 11. The recording surface may be formed on only one side of the magnetic disk 11 or on both sides of the magnetic disk 11.

The AE 13 selects one head element section 12, which accesses the magnetic disk 11, from a plurality of head element sections 12, preamplifies a read signal, which is to be read by the selected head element section 12, by a predetermined gain, and forwards the preamplified signal to the R/W channel 21. The AE 13 also sends a write signal, which is supplied from the R/W channel 21, to the selected head element section 12. Further, the AE 13 supplies a current to the heater and functions as an adjustment circuit for adjusting the amount of such a current (electrical energy).

The R/W channel 21 amplifies the read signal, which is supplied from the AE 13, during a read process until a predetermined amplitude is obtained, extracts data from the resulting read signal, and performs a decoding process. The data to be read includes user data and servo data. The decoded read user data is supplied to the HDC/MPU 23. The R/V channel 21 also performs a write process in accordance with a control signal supplied from the HDC/MPU 23. The R/W channel 21 code-modulates the write data supplied from the HDC/MPU 23 during the write process, converts the code-modulated write data to a write signal, and supplies the resulting write signal to the AE 13.

Within the HDC/MPU 23, the MPU operates in accordance with a microcode that is loaded into the RAM 24. When the hard disk drive 1 starts up, the microcode operating in the MPU and the data required for control and data processing are loaded into the RAM 24 from the magnetic disk 11 or ROM (not shown). The HDC/MPU 23 not only performs processes necessary for read/write process control, command execution sequence management, servo-signal-based head element section positioning control (servo control), interface control, and defect management and other data processes, but also exercises overall control over the hard disk drive 1. Particularly, the HDC/MPU 23 according to the present embodiment exercises TFC in accordance with the acceleration detected by the acceleration detection section 25. This matter will be described later.

Figure 2:
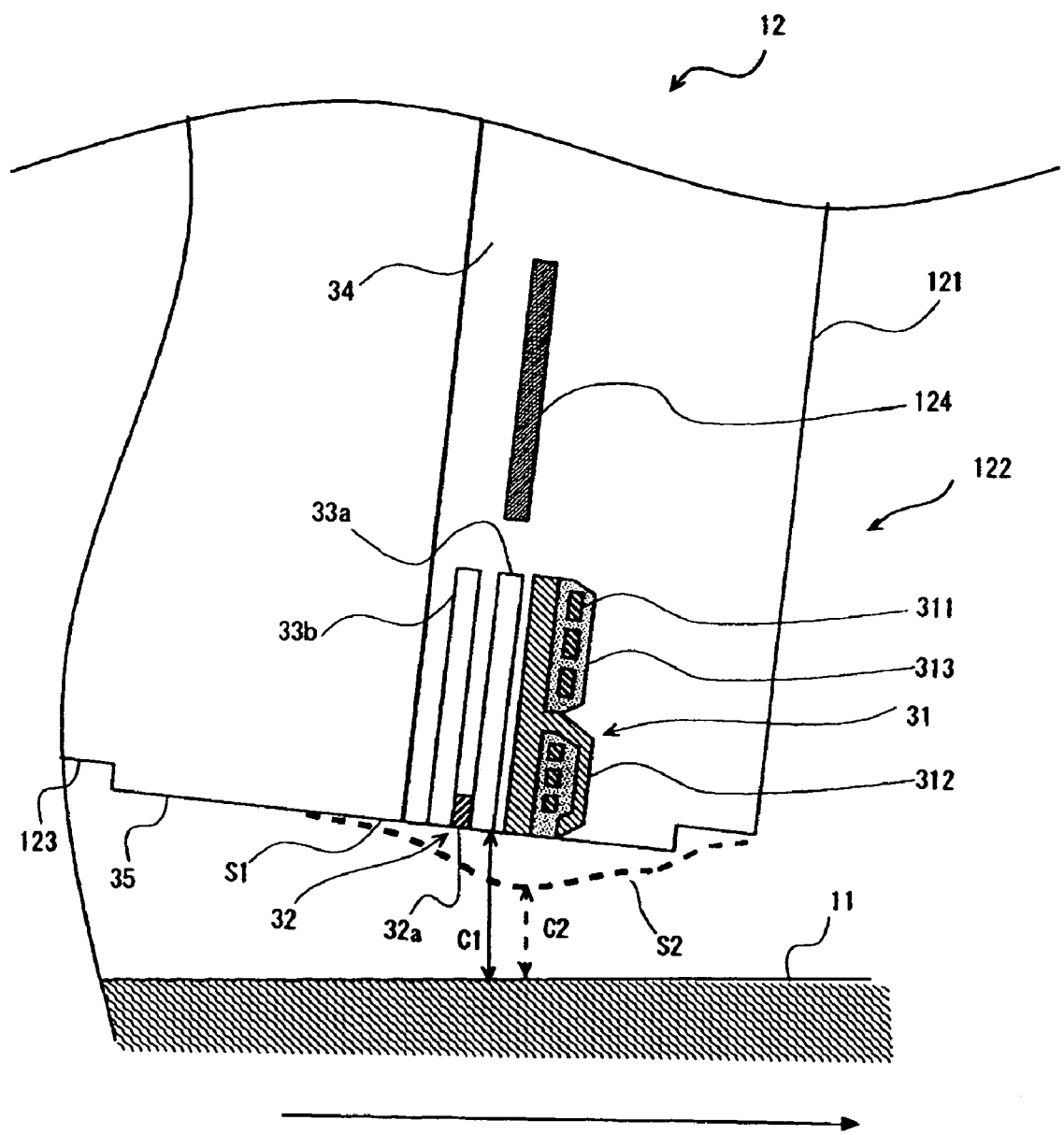
FIG. 2 is a schematic cross-sectional view illustrating the configuration of a head slider that includes a TFC heater in accordance with an embodiment of the present invention.

As described above, the TFC technology is implemented in the hard disk drive 1 according to the present embodiment to adjust the clearance between the head element section and magnetic disk 11. The configuration of the TFC head slider 12 according to an embodiment of the present invention will now be described. FIG. 2 is a cross-sectional view illustrating the configuration of a section near an air outflow end face (trailing end face) 121 of the head slider 12. The magnetic disk 11 rotates from left to right in FIG. 2. The head slider 12 includes a head element section 122 and a slider 123 that supports the head element section 122. The TFC technology according to the present embodiment can be applied to horizontal magnetic recording hard disk drives and perpendicular magnetic recording hard disk drives.

The head element section 122 performs magnetic data read/write operations in relation to the magnetic disk 11. The head element section 122 includes a read element 32 and a write element 31, which is positioned at the trailing end of the read element. The write element 31 is an inductive element that generates a magnetic field between magnetic pole pieces 312 by using a current flowing in a write coil 311, and writes magnetic data onto the magnetic disk 11. The read element 32 includes a magnetic anisotropic magnetoresistive element 32a and reads magnetic data recorded on the magnetic disk 11 in accordance with a resistance value that varies with the magnetic field generated from the magnetic disk 11.

The head element section 122 is formed on an AlTiC circuit board, which constitutes the slider 123, by performing a plating, sputtering, polishing, or other thin-film formation process. The magnetoresistive element 32a is sandwiched between magnetic shields 33a, 33b. The write coil 311 is enclosed by an insulating film 313. The head element section 122 furnishes the circumferences of the write element 31 and read element 32 with a protective film 34 of alumina or the like. The head element section 122 is entirely protected by the protective film 34.

A heater 124 made of a thin-film resistive element is formed near the write element 31 and read element 32 by performing a thin-film formation process. The heater 124 is positioned within the head element section 122 and away from the magnetic disk 11. For example, the heater 124 may be formed by allowing Permalloy to meander as a thin-film resistive element and filling gaps with alumina.

When the AE 13 applies a current to the heater 124, the heater 124 generates heat so that a portion near the head element section 122 protrudes. While no heat is generated, the ABS of the head slider 12 is shaped as indicated by S1, and the clearance, which is the distance between the head element section 122 and magnetic disk, is indicated by C1. The shape S2 of the protrusion, which arises when the heater 124 generates heat, is indicated by a broken line in FIG. 2. The head element section 122 comes closer to the magnetic disk 11 and the resulting clearance C2 is smaller than the clearance C1. FIG. 2 is a conceptual diagram that does not accurately represent a dimensional relationship. The protrusion amount of the shape S2 of the protrusion is in the nanometer order (several nanometers).

Figure 3:
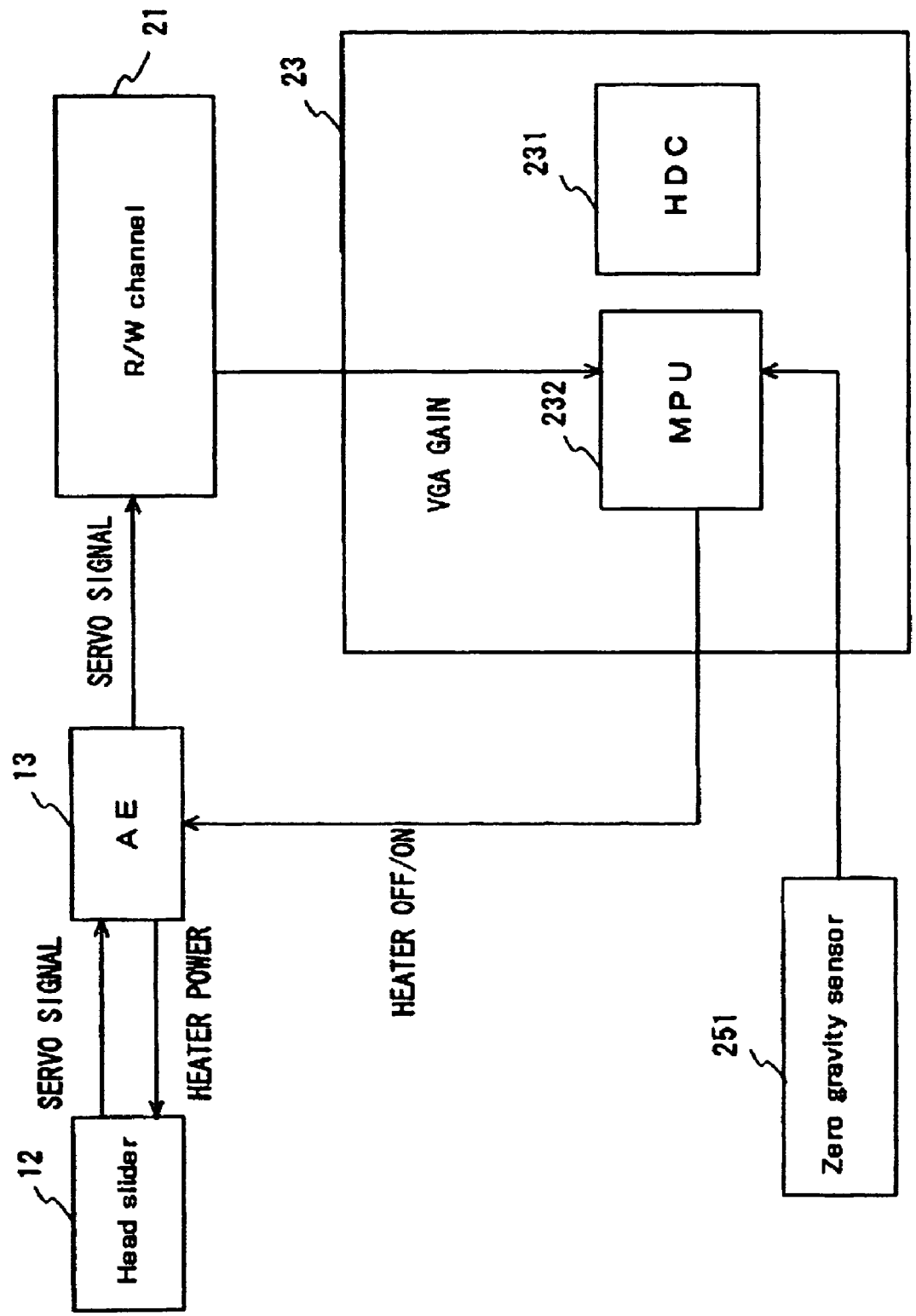
FIG. 3 is a schematic block diagram illustrating component elements according to an embodiment of the present invention that exercise heater control in accordance with the detection of a fall of the hard disk drive.

As described above, the hard disk drive 1 according to the present embodiment detects its acceleration and exercises ON/OFF control over the heater 124 in accordance with the detected acceleration to prevent the head element section 122 from colliding against the magnetic disk 11. In some embodiments, the acceleration detection section 25 includes a zero gravity sensor 251 as shown in FIG. 3. The zero gravity sensor 251 detects the acceleration in the direction of gravity to detect a fall of the hard disk drive 1. While the hard disk drive 1 is stopped, an acceleration of 1 G exists in the direction of gravity. When the acceleration detected in the direction of gravity is smaller than a reference value, the zero gravity sensor 251 detects a fall. The heater 124 turns OFF in response to the detection of a fall of the hard disk drive 1, thereby reducing the protrusion amount of the head element section 122 before collision and preventing the head element section 122 from colliding against the magnetic disk 11.

The zero gravity sensor 251 detects acceleration along each of the X, Y, and Z axes. When the accelerations detected along all the three axes are lower than a reference level, the zero gravity sensor 251 outputs a signal that indicates a fall of the hard disk drive 1. There are various sensor types, including a piezoresistive type, capacitance type, and magnetic type. Any of these types of sensors may be used as the zero gravity sensor 251 according to the present embodiment.

When the zero gravity sensor 251 detects a fall, the HDC/MPU 23 shuts off the current supply to the heater 124 and turns OFF the heater 124. When the hard disk drive 1 falls, it is highly probable that a significant impact will be applied to the hard disk drive 1. The heater 124 is turned OFF before impact application to reduce the protrusion amount of the head element section 122 and increase the clearance between the magnetic disk 11 and head element section 122, thereby avoiding a collision between the magnetic disk 11 and head element section 122. Since a considerable amount of time elapses between the instant at which the zero gravity sensor 251 detects a fall and the instant at which an impact is applied, the protrusion amount of the head element section 122 can be reduced before impact application.

Further, the HDC/MPU 23 detects the residual vibration of the actuator 16 (head element section 122), and turns ON the heater 122 after the residual vibration ends. When an impact is applied to the hard disk drive 1, the actuator 16 significantly vibrates, and then a great residual vibration occurs particularly at a resonance frequency. After the residual vibration becomes lower than a reference level, the heater 124 is turned ON. This reduces the possibility of collision between the head element section 122 and magnetic disk 11 due to residual vibration.

Figure 4:
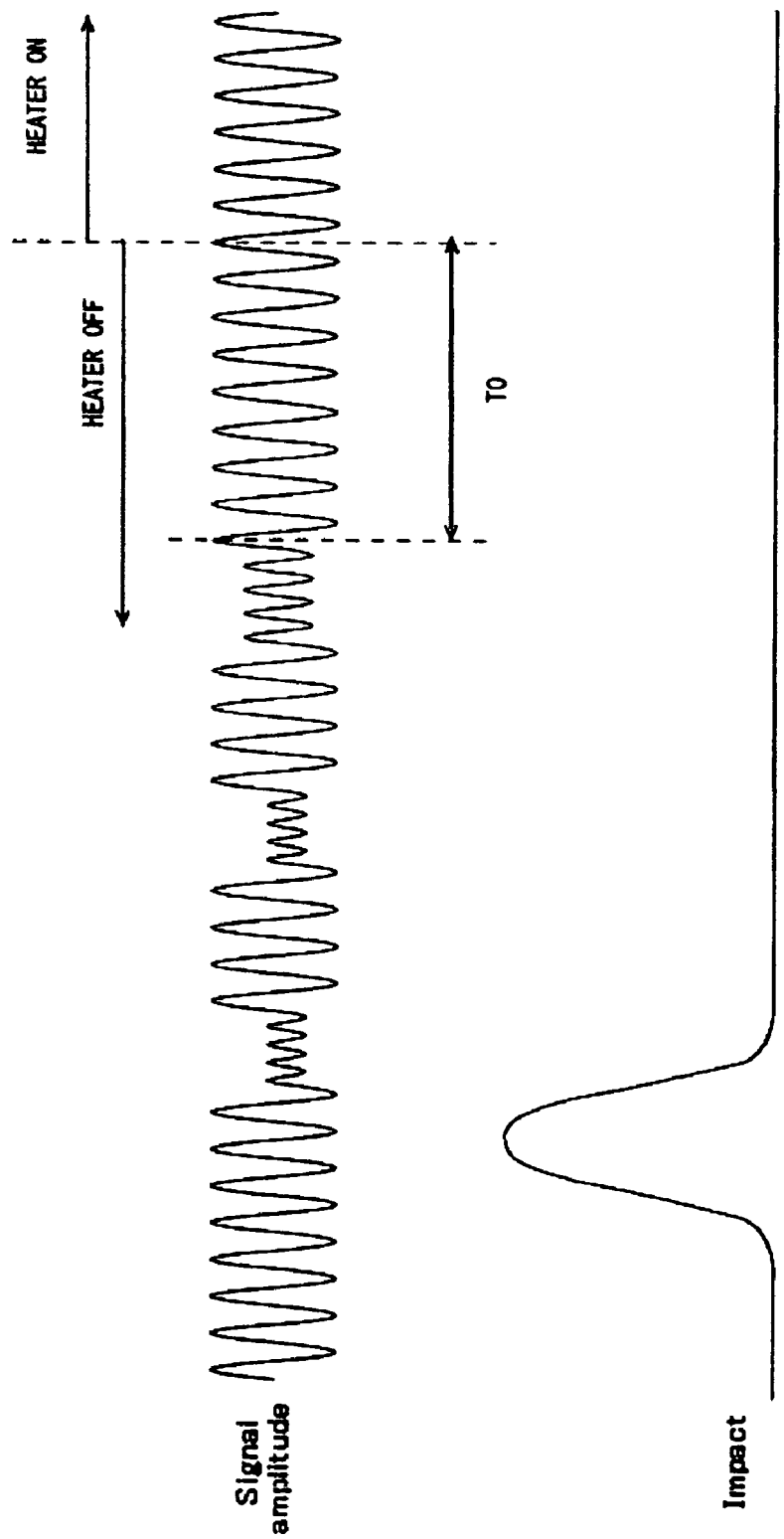
FIG. 4 is a schematic diagram illustrating the relationship between the impact applied to the hard disk drive according to an embodiment of the present invention and the signal amplitude that is read from a magnetic disk by a head element section.

The residual vibration of the head element section 122 (actuator 16) can be determined in accordance with the amplitude of its read signal. FIG. 4 is a schematic diagram illustrating the relationship between the impact applied to the hard disk drive 1 and the signal amplitude that is read from the magnetic disk 11 by the head element section 122. The output of the AE 13 changes in the same manner as indicated in the figure.

When an impact is applied, the signal amplitude greatly changes. When the head element section 122 moves away from the magnetic disk 11, the amplitude decreases. When the head element section 122 moves toward the magnetic disk 11, the amplitude increases. After impact application, the read signal increases and decreases its amplitude repeatedly due to residual vibration. When the residual vibration ends, a normal signal amplitude persists. Therefore, when, for instance, the change in the signal amplitude remains smaller than a reference value during a reference period TO, it can be concluded that the residual vibration is ended.

The processes performed by the component elements will now be described in detail. In a read/write process, for instance, the HDC/MPU 23 controls the actuator 16 to move the head element section 122 toward a target sector in compliance with a command issued by the host 51. The MPU 232 supplies a current to turn ON the heater 124 with predefined timing. When the zero gravity sensor 251 later detects a fall of the hard disk drive 1, the MPU 232 instructs the AE 13 to turn OFF the heater 122. In compliance with instructions from the MPU 232, the AE 13 shuts off the current supply to the heater 124.

When the fall subsequently ends, the HDC/MPU 23 exercises servo control to properly position the head element section 122. In this instance, the MPU 232 acquires a gain value (VGA gain) of the servo signal variable gain amplifier (VGA) from the R/W channel 21. The R/W channel 21 includes a variable gain amplifier circuit to exercise automatic gain control (AGC) over the signal supplied from the AE 13 and amplify the signal to a fixed amplitude.

The MPU 232 uses the VGA gain to detect the residual vibration of the head element section 122. Since the VGA gain is in inverse proportion to the signal amplitude supplied from the AE 13, its increase/decrease is the reversal of a signal amplitude increase/decrease shown in FIG. 4. If, for instance, the VGA gain change or maximum value is smaller than a reference value during the reference period T0, the MPU 232 concludes that the residual vibration has become smaller than a reference value and terminated. Residual vibration termination is used as a condition for turning ON the heater 124. When the other conditions are met, the MPU 232 instructs the AE 13 to supply power to the heater 124 and turn it on.

The R/W channel 21 has a register that stores the VGA gain. The MPU 232 accesses the register to acquire a VGA gain that prevails after impact application. The AE 13 has a register that stores an ON/OFF value or power (current) value of the heater 124. The MPU 232 accesses that register to control the heater 124.

Although control becomes complicated, the signal amplitude of user data can be used in addition to the servo signal amplitude for residual vibration detection purposes. The HDC/MPU 23 not only exercises servo control but also exercises user data read control over the R/W channel 21. The user data VGA gain is acquired in addition to the servo signal VGA gain and used for residual vibration judgment purposes. In the above example, the MPU 232 judges the residual vibration with the VGA gain corresponding to the signal amplitude. However, the residual vibration can also be directly judged from the changes in the signal amplitude from the AE 13. These matters also hold true in the other embodiments described below.

Figure 5:
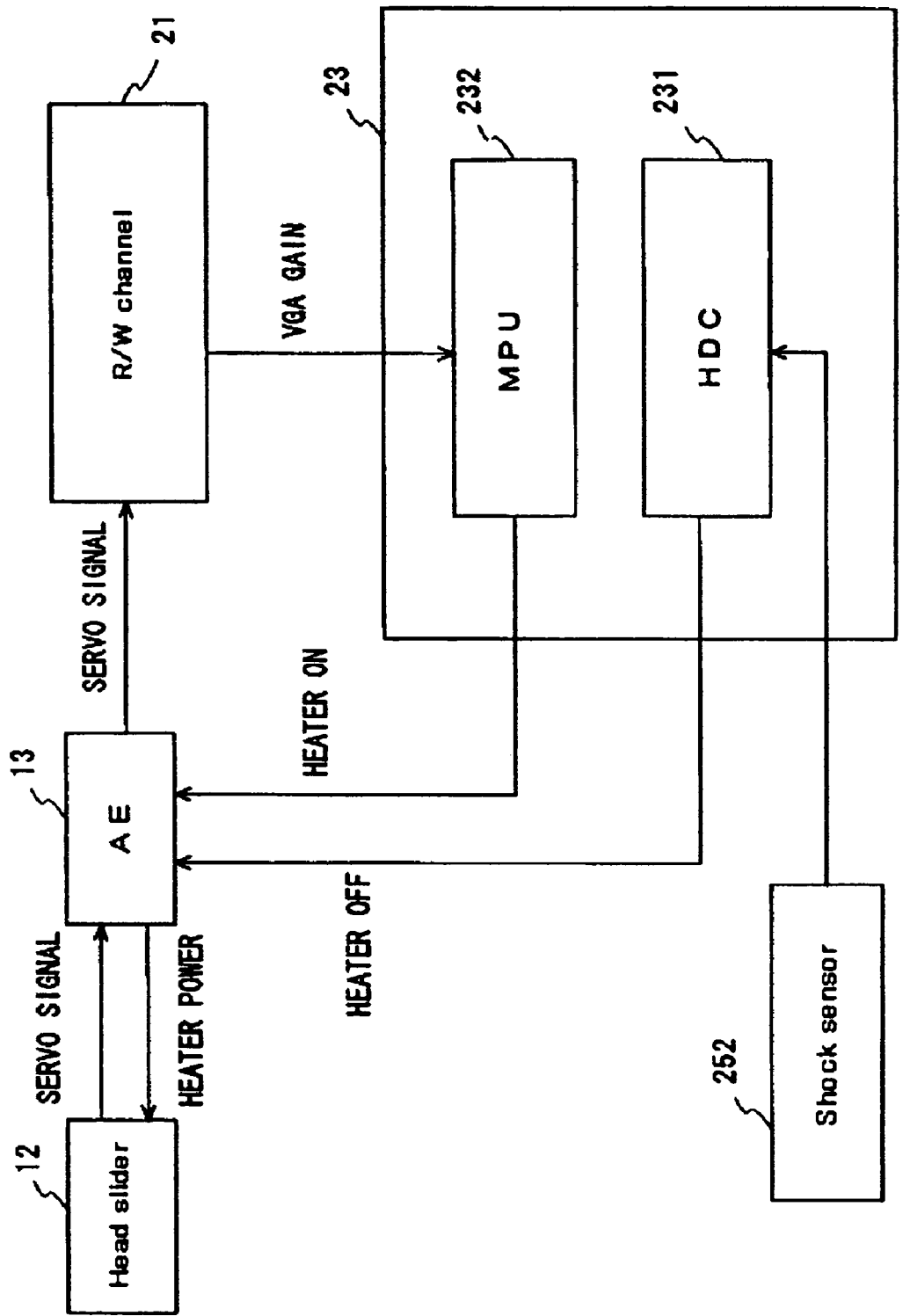
FIG. 5 is a schematic block diagram illustrating component elements according to an embodiment of the present invention that exercise heater control in accordance with the detection of an impact on the hard disk drive.

An embodiment of the present invention in which the acceleration detection section 25 includes a shock sensor 252 instead of the zero gravity sensor 251 will now be described with reference to FIG. 5. The shock sensor 252 detects acceleration along one axis or a plurality of axes, and outputs a signal that indicates the magnitude of the detected acceleration, that is, the detected impact. As is the case with the zero gravity sensor 251, a piezoresistive type, capacitance type, or magnetic type shock sensor may be used.

In the hard disk drive 1 according to the present embodiment, the HDC 231 turns OFF the heater 124 in accordance with the impact detected by the shock sensor 252. As described with reference to FIG. 4, there is a short interval between the instant at which an impact is applied and the instant at which the actuator 16 (head element section 122) greatly deforms. Therefore, the heater 124 is turned OFF during such a short interval to decrease the protrusion amount of the head element section 122, thereby reducing the possibility of collision between the head element section 122 and magnetic disk 11.

In general, the time required for the head element section 122 to respond (protrude/contract) to heating by the heater 124 is several milliseconds. On the other hand, the interval between the instant at which the hard disk drive 1 is impacted and the instant at which the head element section 122 deforms is several milliseconds minimum although it varies with the applied impact and with the embodiment. Therefore, it is necessary that the heater 124 turn OFF immediately after an impact is detected by the shock sensor 252. In the present embodiment, the HDC 231, which provides hardware logic, turns OFF the heater 124 in response to the detection achieved by the shock sensor 252. Thus, the heater 124 turns OFF without delay.

More specifically, if the shock sensor 252 detects an impact greater than a reference value while the heater 124 is ON for a read/write process or the like, the HDC 231 instructs the AE 13 to turn OFF the heater 124. Subsequently, the heater 124 turns back ON after the residual vibration of the actuator 16 ends. The method of residual vibration detection will not be explained here because it can be the same as the method described above.

Figure 6:
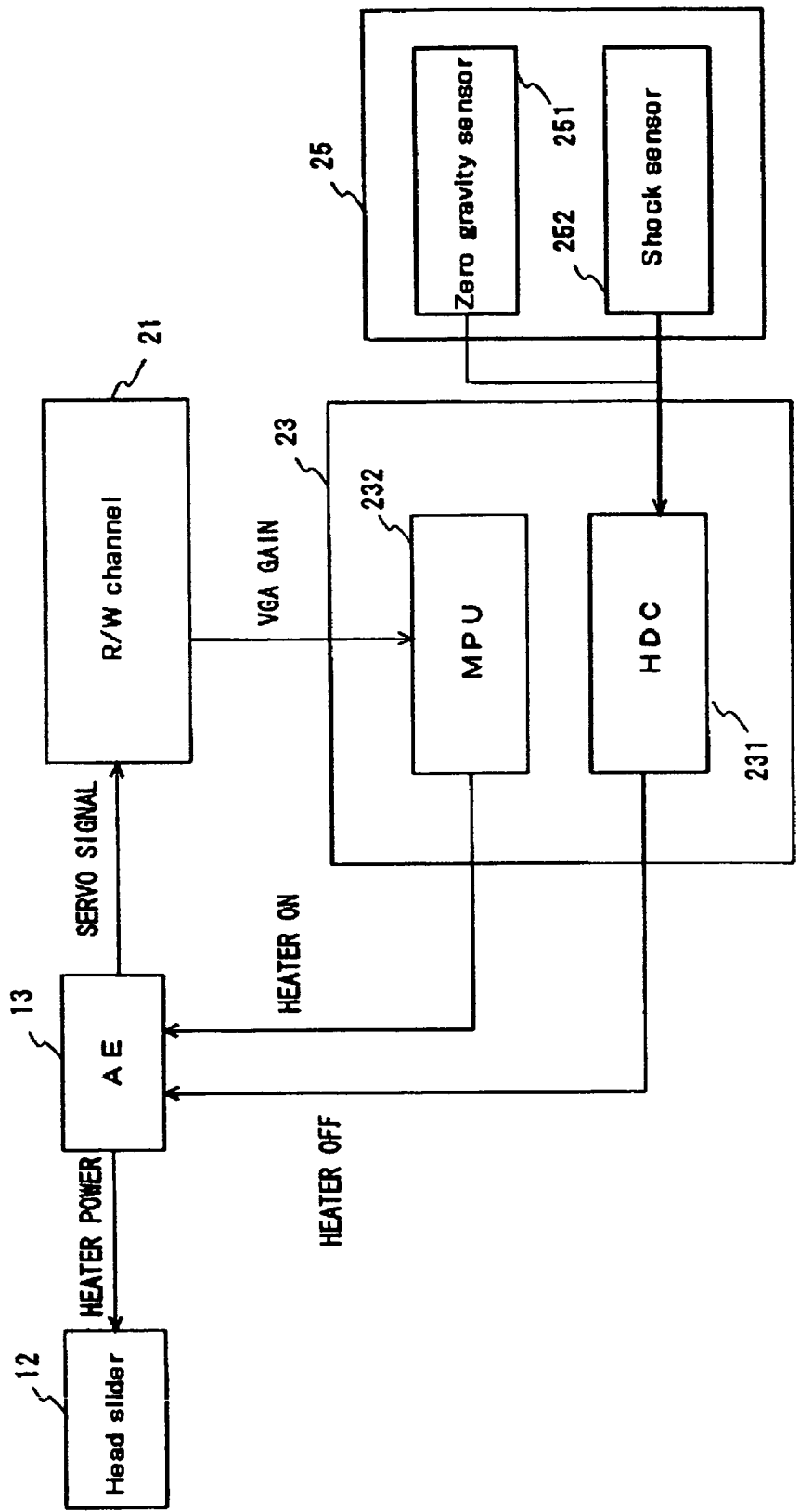
FIG. 6 is a schematic block diagram illustrating component elements according to an embodiment of the present invention that exercise heater control in accordance with the detection of a fall of the hard disk drive and the detection of an impact on the hard disk drive.

An embodiment of the present invention in which the acceleration detection section 25 includes both the zero gravity sensor 251 and shock sensor 252 as indicated in a block diagram in FIG. 6 will now be described. The use of these two sensors makes it possible to not only exercise proper ON/OFF control over the heater 124 in response to a fall-induced impact but also exercise ON/OFF control over the heater 124 in response to an impact that is not based on a fall.

In the present embodiment, the acceleration detection section 25 has two sensor elements. However, an alternative configuration may be employed so that one sensor element is capable of detecting two different impacts. In the present embodiment, the detection signals of both the zero gravity sensor 251 and shock sensor 252 are output to the HDC 231. However, an alternative configuration may be adopted so that the MPU 232 receives the detection signal of the zero gravity sensor 251 to exercise heater control accordingly.

Figure 7:
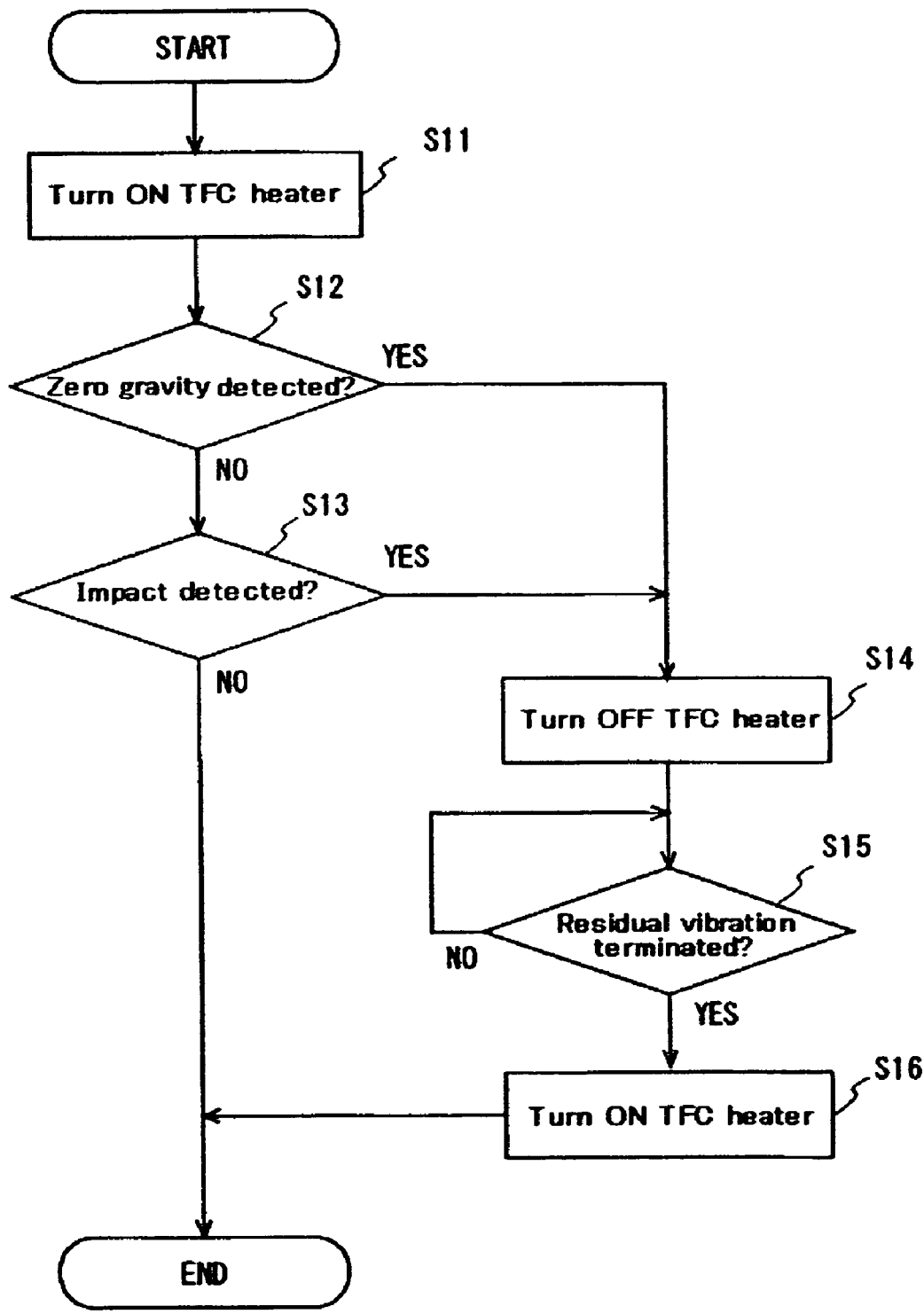
FIG. 7 is a flowchart illustrating a heater control process according to an embodiment of the present invention that is performed in accordance with the detection of a fall of the hard disk drive and the detection of an impact on the hard disk drive.

Heater control according to an embodiment of the present invention will now be described with reference to the block diagram in FIG. 6 and a flowchart in FIG. 7. When the access to the magnetic disk 11 begins due, for instance, to a read/write process, the MPU 232 turns ON the heater 124 (step S11). More specifically, the MPU 232 sets a heater ON command in the register of the AE 13, and the AE 13 supplies power to the heater 124 in compliance with the command.

If the zero gravity sensor 251 later detects a fall of the hard disk drive 1 (if the query in step S12 is answered "Yes"), a signal indicating such a fall detection enters the HDC 231. The HDC 231 turns OFF the heater 124 in response to the fall detection (step S14). More specifically, the HDC 231 sets a heater OFF command in the register of the AE 13, and the AE 13 shuts off the power supply to the heater 124 in compliance with the command.

After the heater 124 is turned OFF, the hard disk drive 1 measures the residual vibration of the head element section 122. If the measured residual vibration is lower than a reference level (step S15), the heater 124 turns ON (step S16). More specifically, the MPU 232 monitors the VGA gain of the servo signal in the R/W channel 21, and turns ON the heater 124 when the change in the VGA gain becomes smaller than a reference value. Subsequently, predetermined processes, including an error recovery process (ERP), are performed.

When the shock sensor 252 detects an impact (when the query in step S13 is answered "Yes"), a signal indicating such an impact detection enters the HDC 231. As is the case with fall detection, the HDC 232 turns OFF the heater 124 if the detected impact is greater than a reference value (step S14). The subsequent process is the same as described above. If a fall of the hard disk drive 1 or an impact on the hard disk drive 1 is not detected (if the queries in steps S12 and S13 are answered "No"), the hard disk drive 1 continuously performs a normal process and exercises TFC accordingly until the entire processing operation is completed.

While the present invention has been described in terms of particular embodiments, it should be understood that the invention is not limited to those embodiments. Those skilled in the art will recognize that various changes, additions, and modifications may be readily made to the elements according to the embodiments without departure from the scope and spirit of the invention. For example, the TFC technology according to the present invention can be applied to a hard disk drive incorporating a head slider that includes only a read element or write element. The present invention can also be applied to a different type of disk drive that exercises the same TFC as the hard disk drive according to the present invention.

What is claimed is:

1. A disk drive comprising:
   a slider that flies over a rotating recording disk;
   a head element section that is mounted on the slider;
   a heater that is mounted on the slider to protrude the head element section by means of thermal expansion for the purpose of adjusting the clearance between the head element section and the recording disk, wherein the heater is a thin film resistive element located above a write element and a read element in a height direction relative to the recording disk, and located between the write element and the read element in a direction along a surface of the recording disk;
   an actuator that retains and moves the slider;
   an acceleration detection section; and
   a controller for controlling the heater in accordance with the acceleration detected by the acceleration detection section, wherein the controller turns OFF the heater when the acceleration detection section detects an acceleration lower than a first reference level in the direction of gravity.

2. The disk drive according to claim 1, wherein the controller turns OFF the heater when the acceleration detection section detects an acceleration higher than a second reference level.

3. The disk drive according to claim 1, wherein the controller turns ON the heater when a residual vibration of the head element section is lower than a reference level after the heater is turned OFF.

4. The disk drive according to claim 3, wherein the controller determines the residual vibration level of the head element section in accordance with a signal amplitude that the head element section reads from the recording disk.

5. The disk drive according to claim 4, further comprising:
   a variable gain amplifier for amplifying a signal that is read by the head element section,
   wherein the controller uses a gain value of the variable gain amplifier as the data indicating the signal amplitude.

6. The disk drive according to claim 4, wherein the controller determines the residual vibration level of the head in accordance with the signal amplitude of a servo signal that is read by the head element section.

7. A control method for use in a disk drive comprising a slider that flies over a rotating recording disk; a head element section that is mounted on the slider; and a heater that is mounted on the slider to protrude the head element section by means of thermal expansion for the purpose of adjusting the clearance between the head element section and the recording disk, wherein the heater is a thin film resistive element, located above a write element and a read element in a height direction relative to the recording disk, and located between the write element and the read element in a direction along a surface of the recording disk, the control method comprising the steps of:
   turning ON the heater to let the head element section access the recording disk;
   detecting a fall of the disk drive; and
   turning OFF the heater when a fall of the disk is detected 8. The control method according to claim 7, further comprising the steps of:
   detecting a residual vibration of the head element section after the heater is turned OFF; and
   turning ON the heater when the detected residual vibration is lower than a reference level.

9. The control method according to claim 8, further comprising the step of:
   judging the level of the residual vibration in accordance with the amplitude of a signal that the head element section reads from the recording disk.

10. The control method according to claim 9, further comprising the step of:
    judging the residual vibration in accordance with the amplitude of a servo signal that the head element section reads from the recording disk.

11. A disk drive comprising:
    a slider that flies over a rotating recording disk;
    a head element section that is mounted on the slider;
    a heater that is mounted on the slider to protrude the head element section by means of thermal expansion for the purpose of adjusting the clearance between the head element section and the recording disk, wherein the heater is a thin film resistive element located above a write element and a read element in a height direction relative to the recording disk, and located between the write element and the read element in a direction along a surface of the recording disk;
    an actuator that retains and moves the slider;
    a detection section for detecting a fall of the disk drive; and
    a controller for turning OFF the heater when a fall of the disk drive is detected.

12. The disk drive according to claim 11, wherein the detection section comprises a zero gravity sensor.

13. The control method according to claim 7, wherein detecting a fall of the disk drive and/or an impact on the disk drive comprises detection by a zero gravity sensor.

* * * * *

UNITED STATES PATENT AND TRADEMARK OFFICE
CERTIFICATE OF CORRECTION

PATENT NO.       : 7,616,397 B2                                        Page 1 of 1
APPLICATION NO.  : 11/645251
DATED            : November 10, 2009
INVENTOR(S)      : Hayakawa et al.

It is certified that error appears in the above-identified patent and that said Letters Patent is hereby corrected as shown below:

In the Claims:

Claim 7, column 12, line 14, please delete "disk is detected" and insert -- disk drive is detected --

In the Detailed Description:

Column 6, line 40, please delete "The R/V channel" and insert -- The R/W channel --

Signed and Sealed this

Sixteenth Day of March, 2010

David J. Kappos
*Director of the United States Patent and Trademark Office*